US011205457B2

(12) United States Patent
Rakshit et al.

(10) Patent No.: US 11,205,457 B2
(45) Date of Patent: Dec. 21, 2021

(54) AUTOMATIC DETECTION AND REMEDIATION OF VIDEO IRREGULARITIES

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 16/569,335

(22) Filed: Sep. 12, 2019

(65) Prior Publication Data

US 2021/0082469 A1 Mar. 18, 2021

(51) Int. Cl.
*G11B 27/031* (2006.01)
*G06K 9/00* (2006.01)
(Continued)

(52) U.S. Cl.
CPC ........ *G11B 27/031* (2013.01); *G06K 9/00758* (2013.01); *G06T 7/0002* (2013.01);
(Continued)

(58) Field of Classification Search
CPC ..... G11B 27/031; G06T 7/194; G06T 7/0002; G06T 2207/10016; G06T 2207/30168; G06K 9/00758
See application file for complete search history.

(56) References Cited

U.S. PATENT DOCUMENTS 10,095,696 B1 10/2018 Turley et al.
2010/0257569 A1 10/2010 O'Hanlon
(Continued)

OTHER PUBLICATIONS

Grigonis, "Adobe and Stanford just taught AI to edit videos—with impressive results", Jun. 24, 2017, https://www.digitaltrends.com/photography/adobe-stanford-ai-video-editor/.
(Continued)

*Primary Examiner* — Sunghyoun Park
(74) *Attorney, Agent, or Firm* — Garg Law Firm, PLLC; Rakesh Garg; Christopher Pignato

(57) ABSTRACT

An embodiment includes receiving, by one or more processors, a scene reference that corresponds to a reference state of the scene. The embodiment also includes comparing, by one or more processors, the candidate portion and the scene reference such that the comparing provides an indication of an irregularity in the candidate portion. The embodiment also includes responsive to the indication of the irregularity in the candidate portion, automatically evaluating the irregularity, using one or more processors, such that the evaluating generates a severity value associated with the irregularity. The embodiment also includes, responsive to the generating of the severity value, automatically initiating, by one or more processors, a selected remedial action from among a plurality of remedial action options based at least in part on the severity value, wherein the automatic initiation of the selected remedial action includes automatic actuation of an element of video production equipment.

19 Claims, 7 Drawing Sheets

(51) Int. Cl.
*G06T 7/194* (2017.01)
*G06T 7/00* (2017.01)

(52) U.S. Cl.
CPC .... *G06T 7/194* (2017.01); *G06T 2207/10016* (2013.01); *G06T 2207/30168* (2013.01)

(56) References Cited

U.S. PATENT DOCUMENTS

| | | | |
|---|---|---|---|
| 2014/0143218 A1 | 5/2014 | Sanghavi et al. | |
| 2015/0189130 A1 | 7/2015 | Milosevski et al. | |
| 2015/0193986 A1* | 7/2015 | Nistel | G06T 15/04 345/426 |
| 2016/0027175 A1* | 1/2016 | Kim | G06T 7/0016 382/131 |
| 2016/0071058 A1 | 3/2016 | Galuten | |
| 2016/0142625 A1* | 5/2016 | Weksler | H04N 5/23222 348/222.1 |
| 2017/0026566 A1* | 1/2017 | Nitto | H04N 5/23218 |
| 2017/0085774 A1 | 3/2017 | Majumdar et al. | |
| 2017/0125064 A1* | 5/2017 | Aggarwal | H04N 5/232945 |
| 2017/0219495 A1* | 8/2017 | Nagata | G01N 21/88 |
| 2018/0132007 A1 | 5/2018 | Chou et al. | |
| 2019/0102643 A1* | 4/2019 | Furukawa | G06T 7/194 |
| 2019/0392208 A1* | 12/2019 | Zhou | G06K 9/22 |
| 2020/0219245 A1* | 7/2020 | Doggett | G06K 9/00718 |

OTHER PUBLICATIONS

Lardinois, "Adobe brings more of its AI smarts to its video tools", Apr. 3, 2018, https://techcrunch.com/2018/04/03/adobe-brings-more-of-its-ai-smarts-to-its-video-tools/.

Nvidia Developer, "New AI Imaging Technique Reconstructs Photos with Realistic Results", Apr. 22, 2018, https://news.developer.nvidia.com/new-ai-imaging-technique-reconstructs-photos-with-realistic-results/.

Photolemur, "Great Photos Automatically", https://photolemur.com/windows, Sep. 10, 2019.

Vincent, "Google has open-sourced an AI tool that helps phones shoot pictures in portrait mode", Mar. 14, 2018, https://www.theverge.com/2018/3/14/17120996/google-pixel-phone-portrait-mode-ai-image-segmentation-open-source.

Liszewski, "Deep Learning Can Now Flawlessly Correct Photos Taken in Almost Complete Darkness", May 10, 2018, https://gizmodo.com/deep-learning-can-now-flawlessly-correct-photos-taken-i-1825919192.

* cited by examiner

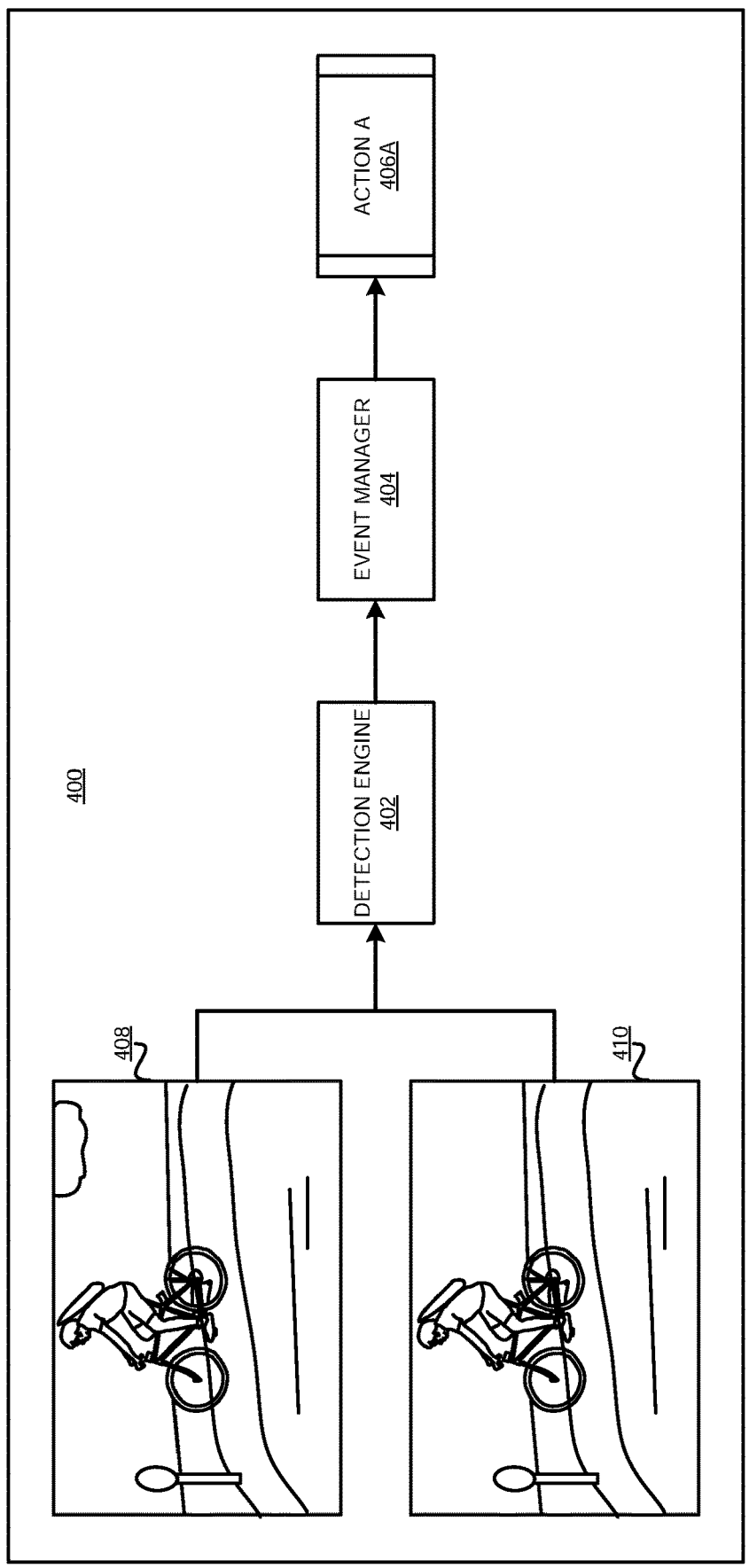

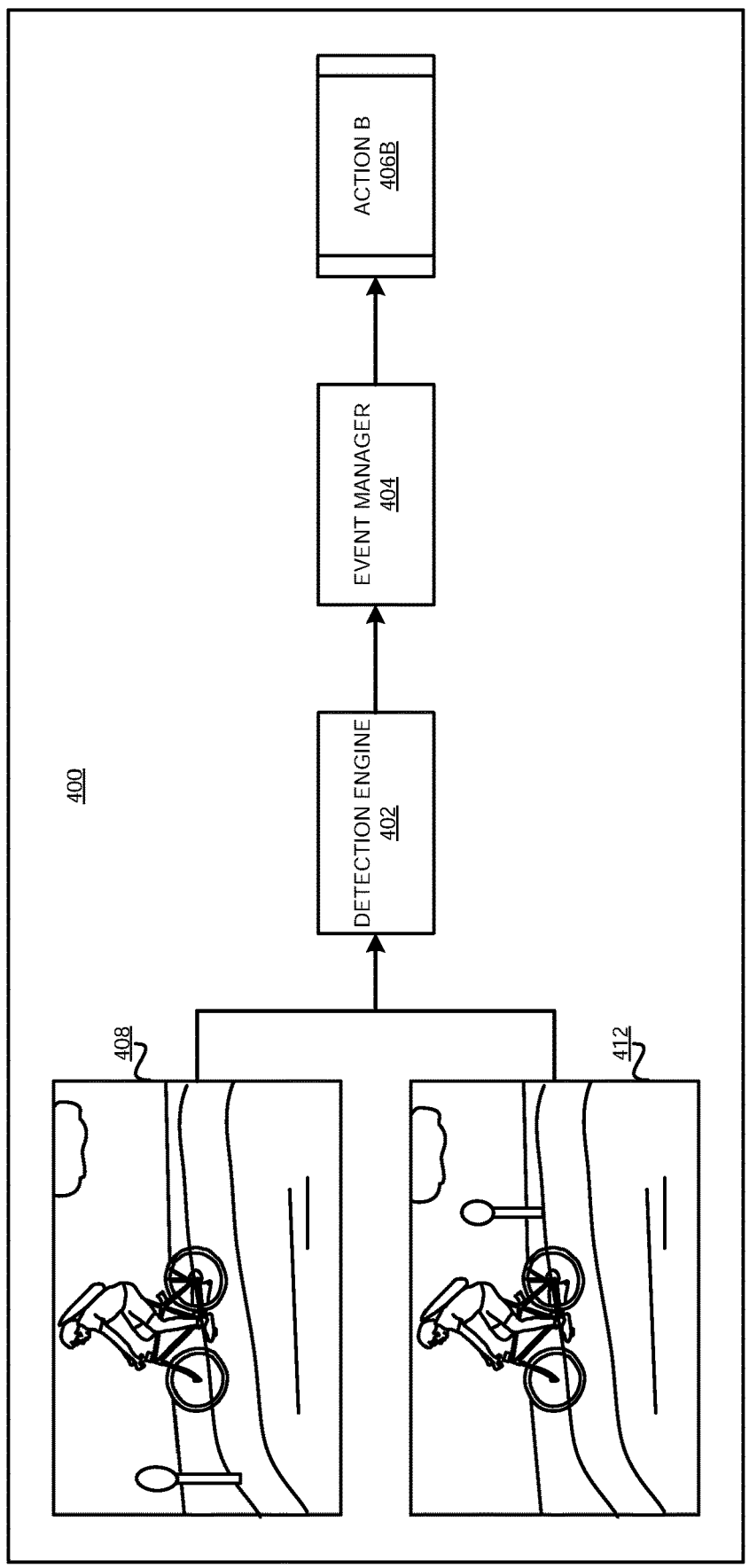

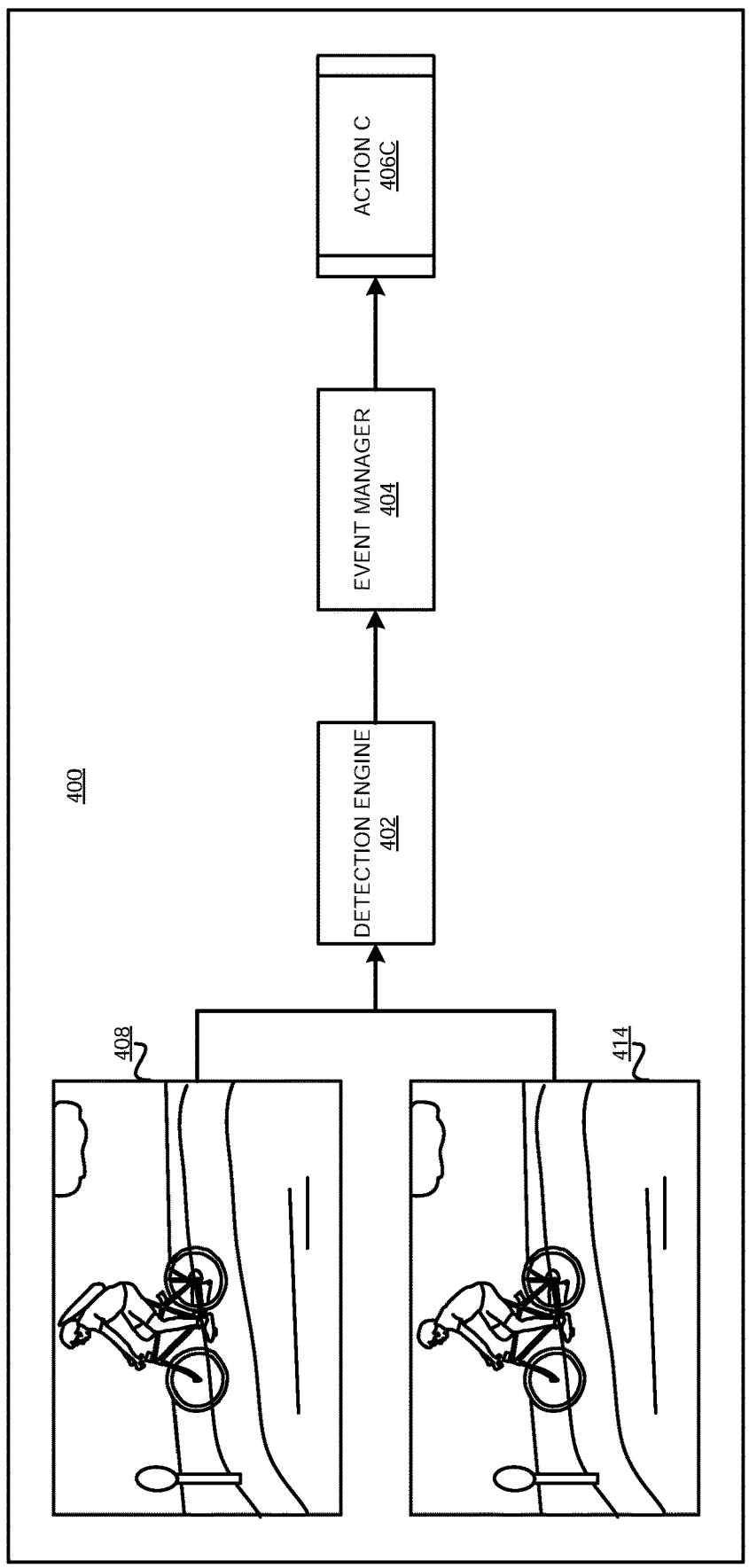

AUTOMATIC DETECTION AND REMEDIATION OF VIDEO IRREGULARITIES

TECHNICAL FIELD

The present invention relates generally to video processing. More particularly, the present invention relates to automatically detecting and remedying video irregularities.

BACKGROUND

Video equipment has become ubiquitous, and video productions range from self-published independent videos and low-budget independent films to big-budget studio productions. These and other types of video productions generally include one or more of three basic production phases. The first phase is "pre-production," which involves the planning stages for the film, such as casting, scouting locations, and storyboarding the movie. The second phase is the principal photography phase, which involves actively shooting the video. The principal photography phase can range from a short, single video shoot to a multi-week, multi-location process involving a myriad of actors and production crew. It is common, especially in such large productions, to shoot a single scene multiple times, for example to accommodate actors' schedules or to capture a scene from multiple angles. The third phase is the post-production phase. This phase involves editing the footage captured during principal photography into a cohesive film. This can include adding musical soundtracks, visual effects, cutting unneeded footage, and sometimes also includes one or more re-shoots to capture additional footage or improve some aspect of existing footage.

SUMMARY

The illustrative embodiments automatically detect and remedy irregularities in video. An embodiment includes receiving, by one or more processors, a scene reference that corresponds to a reference state of the scene. The embodiment also includes comparing, by one or more processors, the candidate portion and the scene reference such that the comparing provides an indication of an irregularity in the candidate portion. The embodiment also includes responsive to the indication of the irregularity in the candidate portion, automatically evaluating the irregularity, using one or more processors, such that the evaluating generates a severity value associated with the irregularity. The embodiment also includes, responsive to the generating of the severity value, automatically initiating, by one or more processors, a selected remedial action from among a plurality of remedial action options based at least in part on the severity value, wherein the automatic initiation of the selected remedial action includes automatic actuation of an element of video production equipment. Other embodiments of this aspect include corresponding computer systems, apparatus, and computer programs recorded on one or more computer storage devices, each configured to perform the actions of the embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4A depicts an example of automatically detecting and remedying video irregularities in accordance with an illustrative embodiment;

FIG. 4B depicts another example of automatically detecting and remedying video irregularities in accordance with an illustrative embodiment;

FIG. 4C depicts another example of automatically detecting and remedying video irregularities in accordance with an illustrative embodiment.

DETAILED DESCRIPTION

Figure 1:
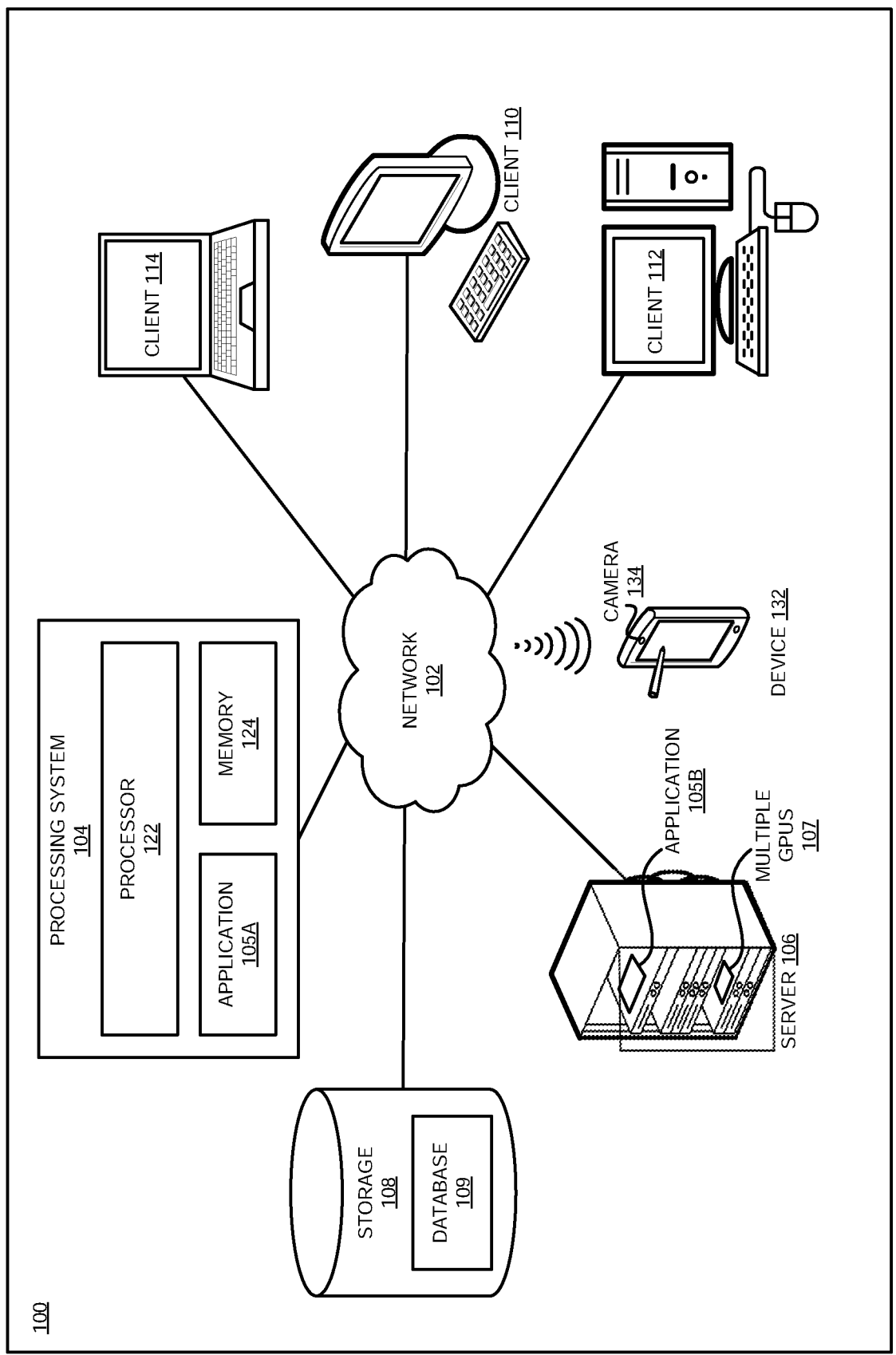
FIG. 1 depicts a block diagram of a network of data processing systems in which illustrative embodiments may be implemented.

Sometimes mistakes happen during a video production. In any video segment that is produced, there is a chance that the video contains an irregularity that has inadvertently been introduced. A common mistake identified is the improper synchronization of image objects present in the different segments of the video. When a video is being made, one shot or scene is sometimes taken with multiple attempts. The video is then edited to assemble the best takes for a given scene, which in some cases may lead to unintended irregularities in segments of video including actors or backgrounds with inconsistent appearances or props. The term "irregularity" as used herein refers to mistakes, errors, or unintentional deviations from continuity. Common types of irregularities include errors in continuity, such as inconsistencies in the characteristics of people, plot, objects, and places depicted in the images, or errors involving objects in the video foreground or background that are outside the scope of the video, such as a modern item appearing in a scene set in the past before the item existed (e.g., an airplane appearing in a scene set in the Middle Ages), or errors involving variations in lighting, color, or camera angle.

Often there are errors that go unnoticed during the principal photography and post-production phases and will not be mentioned until after a video (i.e. movie, sales video, etc.) is released for public view. Once the video is released for public view, often people will identify mistakes in the video and share the same in the public domain, which can have a negative impact on the video. At that point, there is very little, if anything, that can be done to correct the error. Existing options for avoiding such errors lack automated machine-enabled methods of detecting, rating, and correcting irregularities in video productions, and instead rely on manual efforts that are time-consuming and yield inconsistent results.

The illustrative embodiments recognize that there is a need to automatically detect and remedy video irregularities while the video is in production or post-production. For example, some errors have the potential to damage the reputation of the film and those involved in its production. Some such errors distract from the purpose or plot of the video, and can result in poor reviews, unflattering news articles, and undesirable social media posts, all of which in turn can have a negative impact on ticket sales and the profitability of the film.

The illustrative embodiments recognize that the presently available tools or solutions do not address these needs or provide adequate solutions for these needs. The illustrative embodiments used to describe the invention generally address and solve the above-described problems and other problems related to detecting and remedying irregularities in video.

An embodiment can be implemented as a software application. The application implementing an embodiment can be configured as a modification of an existing video production system, as a separate application that operates in conjunction with an existing video production system, a standalone application, or some combination thereof.

Particularly, some illustrative embodiments compare two different video segments, video segments, or images of the same scene or similar scenes, then use the result of the comparison to identify an irregularity in some aspect, including visual and/or audio aspects, of a video production. For simplicity, embodiments herein describe visual comparison of video segments, but alternative embodiments apply the same concepts to other types of video and other characteristics of a video, such as errors in the audio or subtitles, which are collectively referred to herein as irregularities.

In one example implementation, an embodiment receives a candidate image that depicts a scene. In an embodiment, the candidate image is received as a segment of a video stream that includes a plurality of video segments. For example, the candidate image can be a video segment of a video made for education or entertainment. Some embodiments involve other types of video, for example video recorded for security or industrial purposes. For example, an irregularity in security footage can be indicative of a security breach, while an irregularity in an industrial video can be indicative of a problem with equipment, such as an improper setting or a malfunction. Some embodiments involve video that is created, such as computer-generated animations and effects, and video that is recorded with camera equipment, and video that includes a combination of created and recorded content.

In an embodiment, an implementation receives the candidate image and attempts to retrieve a corresponding scene reference. If available, the scene reference serves as a basis for comparison of the candidate image in order to detect irregularities in the candidate image. In some embodiments, the scene reference and candidate image are segments of synchronized video streams. For example, in some embodiments the scene reference is a segment of a video stream that was previously recorded.

In some embodiments, the scene reference is available in a reference storage that stores a plurality of scene references. In some embodiments, the scene references correspond to reference states of scenes that have previously been recorded as video. In some embodiments, the scene references correspond to still images or storyboard images. In some embodiments, the reference storage includes an object database or a video database. In some embodiments, the reference storage is in communication with one or more video feeds, and the reference storage includes a video buffer for storing the received video while the video waits for processing.

In an illustrative embodiment, an image evaluator receives a candidate image that depicts a scene and compares the candidate image to a scene reference from reference storage in order to detect an irregularity in the candidate image. Non-limiting examples of an irregularity in a candidate image include image segments of the candidate image that do not match corresponding segments in the scene reference, and can include differences that disrupt continuity, such as inconsistencies in the characteristics of people, plot, objects, and places depicted in the images, or can include objects within the video foreground or background that are outside the scope of the video, such as a modern item appearing in a scene set in the past before the item existed (e.g., an airplane appearing in a scene set in the Middle Ages), or an include variations in lighting, color, or camera angle.

In an embodiment, the image evaluator retrieves the scene reference from the reference storage that corresponds to a reference state of the scene depicted by the candidate image. In some embodiments, the scene reference and candidate image are segments of separate but synchronized video streams. Some embodiments include an image evaluator that retrieves a scene reference based on timestamps or other known video alignment techniques, for example by establishing correspondences between feature points, feature trajectories, or spatial brightness variations. In some embodiments, the scene reference is a still image or illustration that depicts one or more elements of the scene depicted by the candidate image.

In the illustrative embodiment, the severity classifier automatically evaluates the irregularity and generates a severity value associated with the irregularity based on the evaluation. In some embodiments, the severity classifier includes functionality for estimating a foreground region and a background region of the candidate image and determining whether the irregularity is in the background region or in the foreground region of the candidate image. In such embodiments, the severity value depends at least in part on whether the irregularity is in the foreground region or in the background region of the candidate image.

In some embodiments, the severity classifier includes machine-learning classifier model that generates the severity value for the irregularity. In some such embodiments, the severity classifier uses classification model based on a neural network algorithm, for example a Convolutional Neural Network (CNN) or Deep Neural Networks (DNNs). During the configuration process, application uses labelled images of various irregularities to train the classification model to classify an irregularity in an image according to the training.

In some embodiments, the irregularity is searched for based on crowdsourced feedback identifying a mistake in the video from feedback of viewers. In such embodiments, the image evaluator compares a candidate image from a segment identified by viewers to a scene reference as a way of validating the alleged error. If the irregularity is detected, a severity classifier automatically determines the severity of the mistake. In some such embodiments, an event manager automatically initiates a remedy for the irregularity based on the detected severity.

Embodiments include various starting points to determine the location of the video with a mistake. For example, one user may specify the exact timestamp in the video of the mistake. Another user may make reference to the mistake itself just in text. In case of text description of the mistake, some embodiments use natural language processing (NLP) to identify a location in the that will be checked to validate the irregularity. In some embodiments, once the timestamp location in video is determined, the video segments are compared for specific object or objects in question of the mistake. Some embodiments search multiple segments of the video using image analytics to identify the segments that depict the object related to an alleged irregularity.

In some embodiments, the severity classifier determines the severity of an irregularity based at least in part on a location in an image of the irregularity. For example, in one embodiment, the severity of mistake ranges from most severe where the irregularity is in the foreground and less severe if the irregularity is in the background. As a non-limiting example, in some embodiments, the irregularity is more severe when it involves a main character in the foreground, and is less severe where it involves a prop in the background.

Some embodiments identify an object that is outside the scope of the video, such as a modern object appearing in a scene set prior the existence of the modern object. For example, an embodiment identifies objects within the video foreground or background that are outside the scope of the video topic. Some such embodiment categorize and ratee such irregularities as an indicator of a degree of severity.

Some embodiments identify shadows that should not appear or that appear incorrectly. Some such embodiments identify shadows of significance (i.e., that exceed a predetermined threshold of size or degree of change) in a candidate image. Some such embodiments identify shadow changes between video segments that are evaluated based on a degree of change, and compare the degree of change to one or more threshold values to establish a severity value.

Some embodiments include a machine-learning algorithm to identify common mistakes and rate the severity of such mistakes. Some embodiments categorize the severity of such mistakes based on different measures, for example a number of viewers or an amount of monetary loss. As a non-limiting example, if a video presented through a particular channel normally attracts many viewers, but one such video presented through that channel had significantly fewer viewers, that video is evaluated for irregularities. If an irregularity is found and can be correlated to the loss in viewers, the irregularity is also correlated to the severity value. As a non-limiting example, a loss of viewers less than 5%=severity value of 1 (no remedial action), a loss of viewers between 5% and 10%=severity value of 2 (replace video segment of irregularity from available video if possible as remedial action), and a loss of viewers 10% or greater=a severity value of 3 (replace video segment automatically if available, or retake video and update video).

Alternative embodiments include several different ways of establishing levels or degrees of severity. An additional non-limiting example includes classifying an irregularity involving a primary subject (e.g., main actor in a scene) as a high level of severity, versus classifying an irregularity involving ancillary artifact (e.g., background prop) as a low level of severity. Another non-limiting example includes classifying an irregularity involving a relatively larger percentage of the screen (e.g., greater than 7% of the screen) as a high level of severity, versus classifying a relatively smaller percentage of the screen (e.g., less than 5% of the screen) as a medium level of severity, versus classifying a relatively smaller percentage of the screen (e.g., less than 3% of the screen) as a low level of severity. Another non-limiting example includes classifying irregularities based on types of mistakes, such as a facial feature (i.e., beauty mark, facial hair, etc.) changing from one frame to the next as a high level of severity, changes in actor costume (i.e., suspenders, shirt color, etc.) changing from one frame to the next as a medium level of severity, and changes in background object not same between frames (background object not same between frames) changing from one frame to the next as a low level of severity. A further non-limiting example includes weighting any of the severity classes based on a number of crowdsource feedback posts, for example if an item is severity=2, but the number of feedback is high (i.e., above a predetermined threshold), the high level of feedback adds weight to the severity level, raising it to severity=1.

In some embodiments, severity is defined as either above or below a self-correct threshold, and if it exceeds the threshold, the video is automatically configured to auto correct a video frame(s), or notification of the mistake for the owner of the video or director to take action at their own discretion.

Embodiments herein describe visual comparison of video segments, but alternative embodiments apply the same concepts to other types of video and other characteristics of a video. Non-limiting examples described herein include errors in the audio or subtitles, which are collectively referred to herein as irregularities.

In some embodiments, the application includes a parser for receiving and parsing the reference segment. In some embodiments, the data parser extracts graphical data from reference segment and stores it as graphical reference, extracts visual data from reference segment and stores it as visual reference, and extracts audio data from reference segment and stores it as audio reference. In some embodiments, data parser also receives and parses the candidate segment into graphical, visual, and/or audio data for graphical, visual, and/or audio candidate segments, respectively, allowing the segment evaluator to make separate comparisons of the graphical, visual, and audio reference segments to graphical, visual, and audio candidate segments, respectively. In some embodiments, a candidate portion comprises an audio track associated with the video segment, a scene reference comprises a reference audio track, and the embodiment checks for an irregularity by comparing the two audio tracks. In some embodiments, a candidate portion comprises a text overlay on a segment in the video segment, wherein the scene reference comprises a reference text, and the embodiment checks for an irregularity by comparing compares the two text overlays.

Some embodiments automatically select a remedial action from among a plurality of remedial action options based at least in part on the severity value. An embodiment decides on a remedial action, and automatically initiates the selected remedial action. There are many examples of possible remedial actions that are implementation specific for responding to the presence of an irregularity. In general, remedial actions include notifications and actions. Non-limiting examples of notifications include alerting a user, for example via a displayed message, an indicator light, or an audible alert. Non-limiting examples of actions include issuing a command for adjusting a camera, lighting, or shading equipment. Some embodiments include designating the irregularity as being ignored based on the severity value being below a threshold value.

An embodiment receives the severity value from a severity classifier. An embodiment includes an indication of the irregularity to which it pertains. An embodiment has access to information about one or more systems that are available for correcting the irregularity, for example an action Library and/or an API library. An embodiment includes an action actuator in communication with the action selector and a scene construction apparatus. In some embodiments, the scene construction apparatus includes a display and video production equipment.

An embodiment acquires a remedial action to initiate in response to the irregularity and severity value from a lookup table or rule-based system, for example from the Action Library or Application Programming Interface (API). In some embodiments, for example, an action actuator is operatively connected to various scene construction apparatus, such as one or more displays and/or pieces of video production equipment. In some embodiments, the action selector receives the indication of irregularity and associated severity value from the severity classifier, and controls an action actuator to initiate a corrective action via the action actuator for controlling some aspect of the scene construction apparatus.

As a non-limiting example, in an embodiment, an action selector receives an indication of irregularity that relates to camera angle, position, height, or speed, and in response queries the action library to find a lookup table or rule that relates the irregularity to an adjustment of the video production equipment, such as a computer-controlled precision motion control system for a camera. In some such embodiments, the action selector looks to the API library for structuring a command for the video production equipment. The action selector then wraps the command in an instruction to the action actuator, for example via Extensible Markup Language (XML) or JavaScript Object Notation (JSON). Upon receiving the instruction from the action selector, issues the command from the action selector to the video production equipment to correct the irregularity.

As another non-limiting example, in an embodiment, the action selector receives an indication of irregularity that relates to a consistency error, for example a main actor in a costume that does not match an earlier shot. In response, the action selector queries the action library to find a lookup table or rule that relates the irregularity to a recommended action being to alert the user to re-shoot the scene or use an earlier shot with a description of the costume error. In some embodiments, the action selector looks to the API library for structuring the desired command for the display. The action selector then wraps the command in an instruction to the action actuator, for example via XML or JSON. Upon receiving the instruction from the action selector, issues the command from the action selector to the video production equipment to correct the irregularity.

For the sake of clarity of the description, and without implying any limitation thereto, embodiments are described using some example configurations. From this disclosure, those of ordinary skill in the art will be able to conceive many alterations, adaptations, and modifications of a described configuration for achieving a described purpose, and the same are contemplated within the scope of an embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
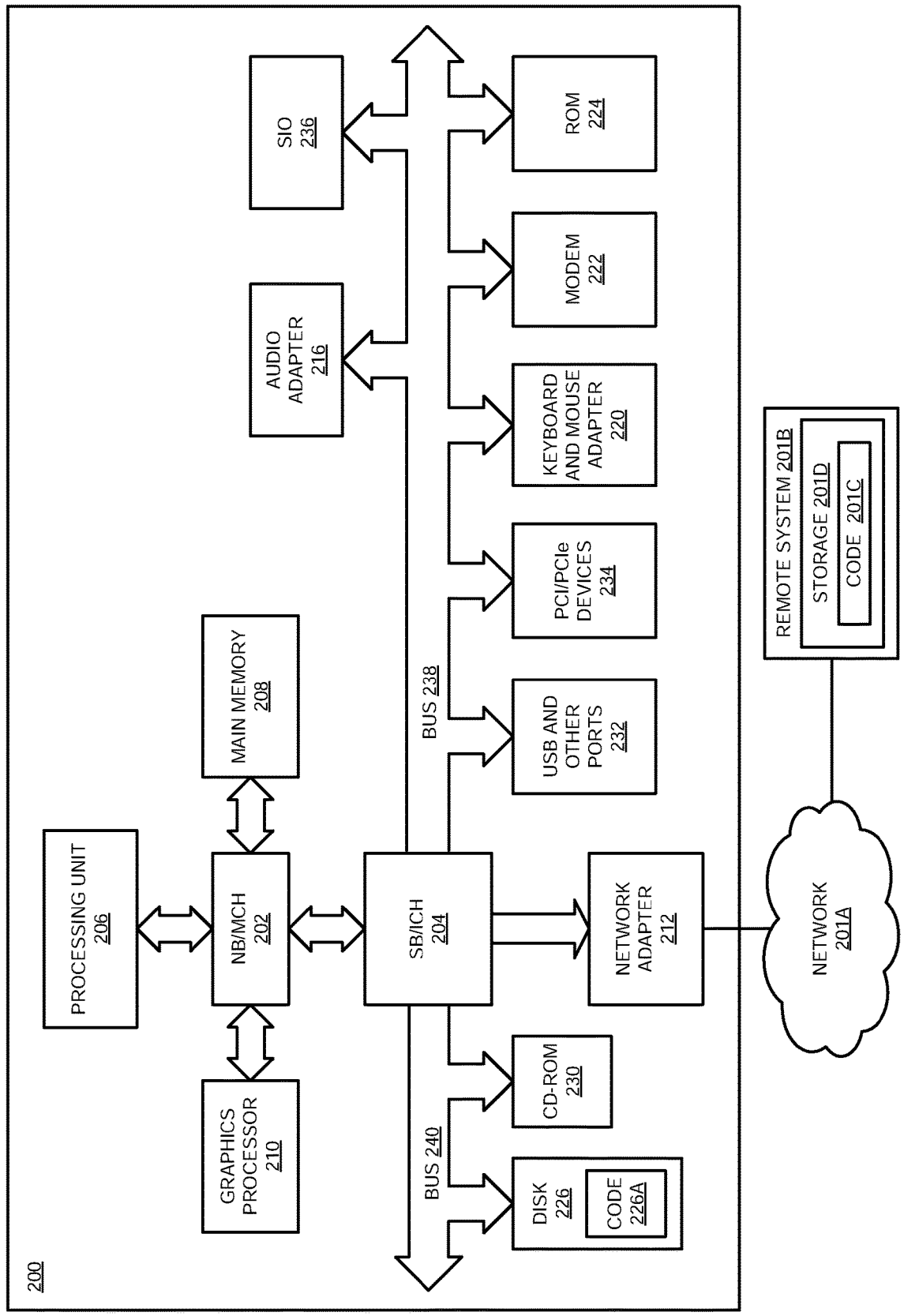
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems, such as conventional data processing system 106 and clients 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Device 132 includes camera 134. Camera 134 is an example of a camera apparatus, image-capturing apparatus, or video-capturing apparatus. Camera 134 can also be installed in any of data conventional data processing systems 106 and clients 110, 112, and 114. Camera 134 can also be a stand-alone device, for example a hand-held or mounted video camera.

Application 105 implements an embodiment described herein. Application 105 can use camera 134 to view a scene, obtain depth information for the scene, and distinguish an image of a three-dimensional object from an image of a two-dimensional rendering of an object. Application 105 can also execute in any of data processing systems 104, 106, 110, 112, and 114, and need not execute in the same system as camera 134 and camera 136.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple Graphics Processing Units (GPUs) 107 including multiple nodes in which each node may include one or more GPUs as described herein. In an embodiment, the GPUs 107 include programmable logic chips (processors) specialized for display functions for rendering images, animations and video for the computer screens. The GPUs 107 are capable of performing parallel operations on multiple sets of data, and are useful as vector processors for non-graphics applications that involve repetitive computations.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
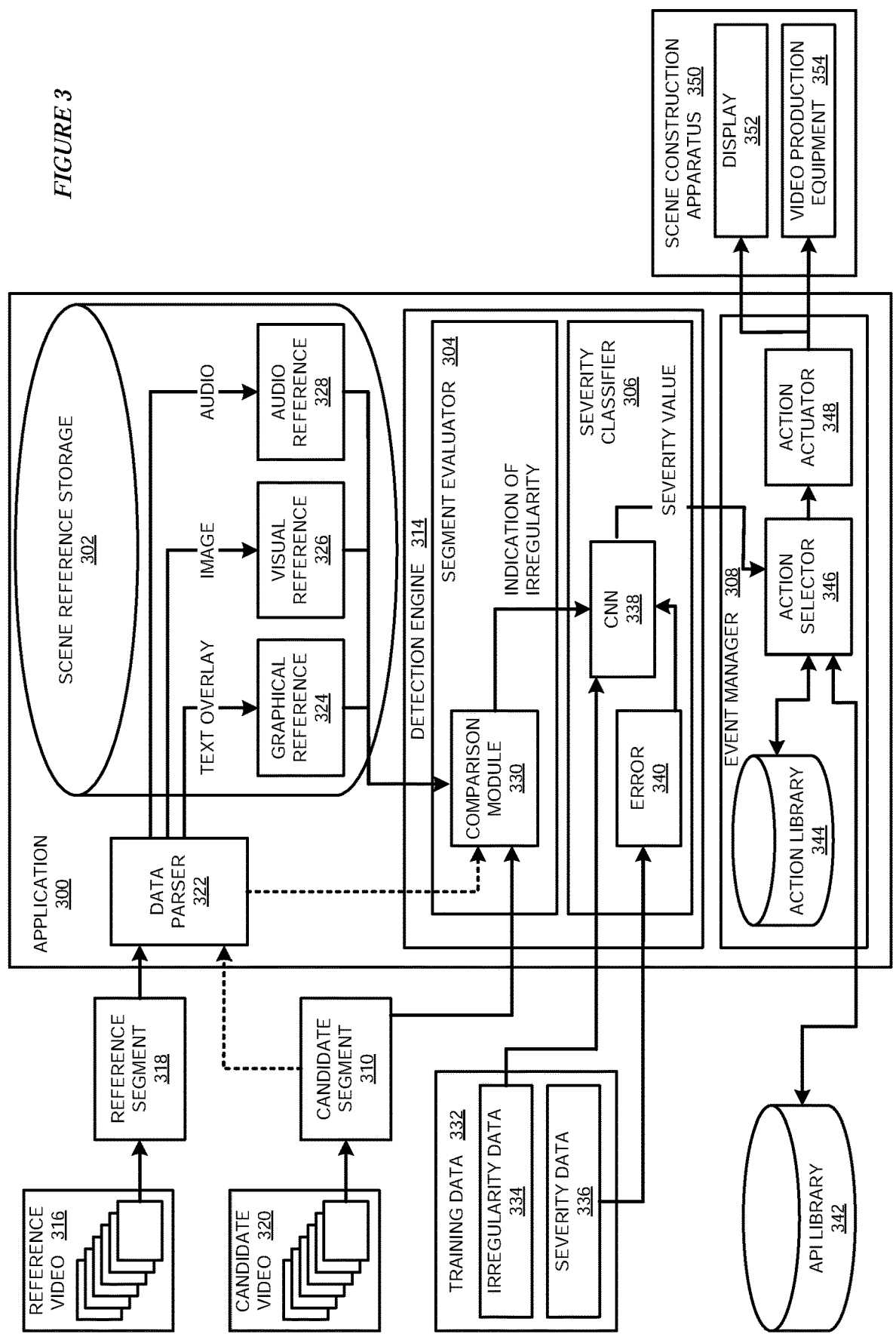
FIG. 3 depicts a block diagram of an example configuration for automatically detecting and remedying video irregularities in accordance with an illustrative embodiment.

With reference to FIG. 3, this figure depicts block diagram of an example configuration for automatically detecting and remedying video irregularities in accordance with an illustrative embodiment. Application 300 is an example of application 105A, 105B in FIG. 1 and executes in any of system 104, server 106, clients 110, 112, and 114, and device 132 in FIG. 1.

In the illustrative embodiment, reference storage 302 stores scene references that correspond to reference states of scenes that have previously been recorded as video or still images or have previously been planned, for example in the form of storyboards. In some embodiments, the reference storage 302 includes a multimedia database, an object database, or a video database. In some embodiments, the application 300 is in communication with one or more video feeds, for example reference video 316 and candidate video 320. In some embodiments, the reference storage 302 includes a video buffer for storing video received by the application 300 while the video waits for processing by the segment evaluator 304. In some embodiments, the application 300 receives segments of video, for example reference segment 318 and candidate segment 310.

In some embodiments, the application 300 includes a data parser 322 for receiving and parsing the reference segment 318. In some embodiments, the data parser 322 extracts graphical data from reference segment 318 and stores it as graphical reference 324, extracts visual data from reference segment 318 and stores it as visual reference 326, and extracts audio data from reference segment 318 and stores it as audio reference 328. In some embodiments, data parser 322 also receives and parses the candidate segment 310 into graphical, visual, and/or audio data for graphical, visual, and/or audio candidate segments, respectively, allowing the segment evaluator 304 to make separate comparisons of the graphical, visual, and audio reference segments to graphical, visual, and audio candidate segments, respectively. In an alternative embodiment, application 300 sends the candidate segment 310 directly to the comparison module 330 for comparison with one or more of the graphical reference 324, visual reference 326, the reference segment 318 or one or more of the graphical components of the reference segment 318 reference 324, visual reference 326, and audio reference 328 data from the reference segment 318.

In the illustrative embodiment, the application 300 sends the candidate segment 310 to the comparison module 330.

The segment evaluator 304 receives a candidate segment 310 that depicts a scene and compares the candidate segment 310 to a scene reference from reference storage 302 in order to detect an irregularity in the candidate segment 310. Non-limiting examples of an irregularity in a candidate segment 310 include image segments of the candidate segment 310 that do not match corresponding segments in the scene reference, and can include differences that disrupt continuity, such as inconsistencies in the characteristics of people, plot, objects, and places depicted in the images, or can include objects within the video foreground or background that are outside the scope of the video, such as a modern item appearing in a scene set in the past before the item existed (e.g., an airplane appearing in a scene set in the Middle Ages), or can include variations in lighting, color, or camera angle. Further examples include differences or errors in graphical data, such as subtitles or other text displayed with or overlaid on the scene in the compared video segments.

The segment evaluator 304 retrieves the scene reference from the reference storage 302 that corresponds to a reference state of the scene depicted by the candidate segment 310. In some embodiments, the segment evaluator 304 retrieves only one or more of the graphical reference 324, visual reference 326, and audio reference 328 of the corresponding reference segment 318, for example to allow for comparison of the image, graphics, and/or audio of the candidate segment 310 to that of the reference segment 318.

In some embodiments, the reference segment 318 and candidate segment 310 are segments of separate but synchronized video streams, and the segment evaluator 304 retrieves a reference segment 318 based on timestamps or other known video alignment techniques, for example by establishing correspondences between feature points, feature trajectories, or spatial brightness variations. In some embodiments, the reference segment 318 includes a storyboard that includes a still image or illustration that depicts one or more elements of the scene depicted by the candidate segment 310.

In the illustrative embodiment, the severity classifier 306 automatically evaluates the irregularity and generates a severity value representative of a seriousness of the irregularity. In the illustrative embodiment, the severity classifier 306 includes cognitive functionality for intelligently and automatically, in response to the indication of the irregularity in the candidate segment 310, evaluating the irregularity and generating a severity value. In the illustrative embodiment, the severity classifier 306 includes a Convolutional Neural Network (CNN) 338 that generates a severity value for each input irregularity. In some alternative embodiments, the severity classifier 306 uses an artificial intelligence algorithm other than a CNN algorithm. For example, as a non-limiting example, the severity classifier 306 includes a Deep Neural Network (DNN).

During the configuration process, CNN 338 uses irregularity data 334 to train the CNN 338 to classify a new irregularity from the segment evaluator 304. CNN 338 comprises any number of convolution layers, or "C layers," each of which includes a set of nodes such that each node in the set is connected to a subset of nodes of one adjacent layer, and a subset of the nodes from the C layer are connected to a node of another adjacent layer. A C layer is particularly configured for feature extraction from image data. A CNN also often, but not necessarily, comprises one or more fully connected layer or "F layer". An F layer includes a set of nodes in which each node is connected to each node in another set of nodes of an adjacent layer.

In some embodiments, irregularity data 334 includes example pictures of different predetermined examples of irregularities. When irregularity data 334 is applied to CNN 338, one or more C layer extracts one or more indirect or variable features about the irregularity data 334. A combination of one or more C layers and optionally one or more F layers combine the extracted features to produce predictions about the severity of irregularities represented in the irregularity data 334. Severity data 336 is obtained from a suitable source of real severity values. Error 340 is a difference between irregularity data 334 for a given irregularity and a predicted severity value price. Error 340 is fed back to CNN 338 in the training process. CNN 338 adjusts the node values in one or more layers in CNN 338 in an attempt to minimize error 340. When error 340 is reduced to at or below a threshold value, CNN 338 is considered trained.

In the illustrated embodiment, the severity classifier 306 receives the irregularity from the segment evaluator 304 as input to the trained CNN 338. In response, the trained CNN 338 produces a severity value prediction for the irregularity. In some embodiments, the severity classifier 306 includes functionality for automatically, in response to the indication of the irregularity in the candidate segment 310, evaluating the irregularity using a rule-based process such that the evaluating generates a severity value based on a rule associated with the detected irregularity. For example, in some such embodiments, the severity classifier 306 includes functionality for estimating a foreground region and a background region of the candidate segment 310 and determining whether the irregularity is in the background region or in the foreground region of the candidate segment 310. In such embodiments, the severity value depends at least in part on whether the irregularity is in the foreground region or in the background region of the candidate image.

In the illustrative embodiment, the event manager 308 automatically selects a remedial action from among a plurality of remedial action options based at least in part on the severity value. In some embodiments, once the event manager 308 decides on a remedial action, the event manager 308 automatically initiates the selected remedial action. There are many examples of possible remedial actions that are implementation specific for responding to the presence of an irregularity. In general, remedial actions include notifications and actions. Non-limiting examples of notifications include alerting a user, for example via a displayed message, an indicator light, or an audible alert. Non-limiting examples of actions include issuing a command for adjusting a camera, lighting, or shading equipment. Some embodiments include designating the irregularity as being ignored based on the severity value being below a threshold value.

In the illustrative embodiment, the event manager 308 includes an action selector 346 that receives the severity value from the severity classifier 306. In some embodiments, the severity value includes an indication of the irregularity to which it pertains. In some embodiments, the event manager 308 has access to information about one or more systems that are available for correcting the irregularity, for example an action Library 344 and/or an API library 342. In some embodiments, the event manager 308 includes an action actuator 348 in communication with the action selector 346 and a scene construction apparatus 350. In some embodiments, the scene construction apparatus 350 includes a display 352 and video production equipment 354.

In some embodiments, the event manager 308 acquires a remedial action to initiate in response to the irregularity and severity value from a look-up table or rule-based system, for example from the Action Library 344 or Application Programming Interface (API) 342. In some embodiments, for example, the action actuator 348 is operatively connected to various scene construction apparatus 350, such as one or more displays 352 and/or pieces of video production equipment 354. In some embodiments, the action selector 346 receives the indication of irregularity and associated severity value from the severity classifier 306, and controls an action actuator to initiate a corrective action via the action actuator 348 for controlling some aspect of the scene construction apparatus 350.

As a non-limiting example, in an embodiment, the action selector 346 receives an indication of irregularity that relates to camera angle, position, height, or speed, and in response queries the action library 344 to find a lookup table or rule that relates the irregularity to an adjustment of the video production equipment 354, such as a computer-controlled precision motion control system for a camera. In some such embodiments, the action selector 346 looks to the API library 342 for structuring a command for the video production equipment 354. The action selector 346 then wraps the command in an instruction to the action actuator 348, for example via XML or JSON. Upon receiving the instruction from the action selector 346, issues the command from the action selector 346 to the video production equipment 354 to correct the irregularity.

As another non-limiting example, in an embodiment, the action selector 346 receives an indication of irregularity that relates to a consistency error, for example a main actor in a costume that does not match an earlier shot. In response, the action selector 346 queries the action library 344 to find a lookup table or rule that relates the irregularity to a recommended action being to alert the user to re-shoot the scene or use an earlier shot with a description of the costume error. In some embodiments, the action selector 346 looks to the API library 342 for structuring the desired command for the display 352. The action selector 346 then wraps the command in an instruction to the action actuator 348, for example via XML or JSON. Upon receiving the instruction from the action selector 346, issues the command from the action selector 346 to the video production equipment 354 to correct the irregularity.

With reference to FIG. 4A, this figure depicts, as a non-limiting example, a configuration 400 for automatically detecting and remedying video irregularities in accordance with an illustrative embodiment. The example can be executed using application 300 in FIG. 3. In the illustrative embodiment, the detection engine 402 includes the functionality of the segment evaluator 304 and severity classifier 306 in FIG. 3. The event manager 404 includes the functionality of the event manager 308 in FIG. 3. Also, action "A" 406A is an example of action 312 in FIG. 3.

As depicted, illustrative embodiment of the configuration 400 includes a detection engine 402 receiving a scene reference 408 and a candidate image 410. Here, candidate image 410 depicts a scene of a cyclist riding outdoors and approaching a sign, and scene reference 408 is an image from an earlier shoot of the same scene shown in the candidate image. In the illustrative embodiment, detection engine 402 compares the scene reference 408 and candidate image 410 and provides an indication of an irregularity in the candidate image due to the sky in the candidate image 410 being clear instead of being cloudy like the sky in the scene reference 408, but evaluates the irregularity to be a minor difference and accordingly generates a low severity value for the irregularity. In response to the low severity level, the event manager 404 selects a remedial action shown as action A 406A. As a non-limiting example, in the illustrated embodiment, the Action A 406A includes automatically alerting a user about the irregularity by issuing a user notification and/or automatically designating the irregularity as "okay to ignore."

In some embodiments, the user has the option of responding to the user notification by instructing the event manager 404 to override the automatically selected remedial action. For example, in such embodiments the user can override the output remedial action A 406A by instructing the event manager 404 to instead initiate a different remedial action. As a non-limiting example, the user overrides the "okay to ignore" remediation with an instruction for post-production correction.

In an embodiment, event manager 404 includes using a classifier model to generate a severity value for the cloudless sky irregularity in candidate image 410. The classifier model generates a severity level that corresponds to an earlier override by the user for a similar irregularity. As a non-limiting example, the user previously issued an override instruction for post-production correction of a cloudless sky after an earlier re-shoot of this or a similar scene. The classifier model was trained with this information, and therefore generates a severity level or post-production instruction as learned from the user's earlier override for this type of irregularity. As a result, the event manager 404 initiates the post-production correction instruction based on the user's earlier instruction for a similar irregularity.

With reference to FIG. 4B, this figure depicts, as a non-limiting example, a configuration 400 for automatically detecting and remedying video irregularities in accordance with an illustrative embodiment. The example can be executed using application 300 in FIG. 3. In the illustrative embodiment, the detection engine 402 includes the functionality of the segment evaluator 304 and severity classifier 306 in FIG. 3. The event manager 404 includes the functionality of the event manager 308 in Figure. Also, action "B" 406B is an example of action 312 in FIG. 3.

As depicted, illustrative embodiment of the configuration 400 includes a detection engine 402 receiving a scene reference 408 and a candidate image 412. Here, candidate image 412 depicts a scene of a cyclist riding outdoors and just passing a sign, and scene reference 408 is an image from an earlier shoot of the same scene shown in the candidate image, but in the reference image the cyclist is approaching a sign. In the illustrative embodiment, detection engine 402 compares the scene reference 408 and candidate image 412 and provides an indication of an irregularity in the candidate image due to the sign constituting an example of an element being in an incorrect location in a scene.

As in the example shown in FIG. 4A, here the detection engine 402 generates a severity value for the irregularity and the event manager 404 selects a remedial action shown as action B 406B. As a non-limiting example, in the illustrated embodiment, the Action B 406B includes instructions to re-shoot after correcting the sign location. Also, as described above in connection with FIG. 4A, here the user has the ability to override the action B 406B. Also, as described above, in an embodiment the detection engine generates a severity level that corresponds to an earlier override by the user such that the event manager 404 initiates a remedial action based on the user's earlier instruction for remedial action for a similar irregularity.

With reference to FIG. 4C, this figure depicts, as a non-limiting example, a configuration 400 for automatically detecting and remedying video irregularities in accordance with an illustrative embodiment. The example can be executed using application 300 in FIG. 3. In the illustrative embodiment, the detection engine 402 includes the functionality of the segment evaluator 304 and severity classifier 306 in FIG. 3. The event manager 404 includes the functionality of the event manager 308 in Figure. Also, action "C" 406C is an example of action 312 in FIG. 3.

As depicted, illustrative embodiment of the configuration 400 includes a detection engine 402 receiving a scene reference 408 and a candidate image 414. Here, candidate image 414 depicts a scene of a cyclist riding outdoors and approaching a sign, and scene reference 408 is an image from an earlier shoot of the same scene shown in the candidate image, but in the reference image the cyclist is wearing a backpack. In the illustrative embodiment, detection engine 402 compares the scene reference 408 and candidate image 414 and provides an indication of an irregularity in the candidate image due to the sign constituting an example of an element having a visual appearance that is incorrect compared to the scene reference 408.

As in the example shown in FIG. 4A, here the detection engine 402 generates a severity value for the irregularity and the event manager 404 selects a remedial action shown as action C 406C. As a non-limiting example, in the illustrated embodiment, the Action B 406B includes instructions to re-shoot with the cyclist wearing a backpack. Also, as described above in connection with FIG. 4A, here the user has the ability to override the action C 406C. For example, if the removal of the backpack was intentional due to a script change, the user can override the re-shoot recommended as remedial action C 406C, for example by changing it to an "okay to ignore" action. Also, as described above, in an embodiment the detection engine generates a severity level that corresponds to an earlier override by the user such that the event manager 404 initiates a remedial action based on the user's earlier instruction for remedial action for a similar irregularity.

Figure 5:
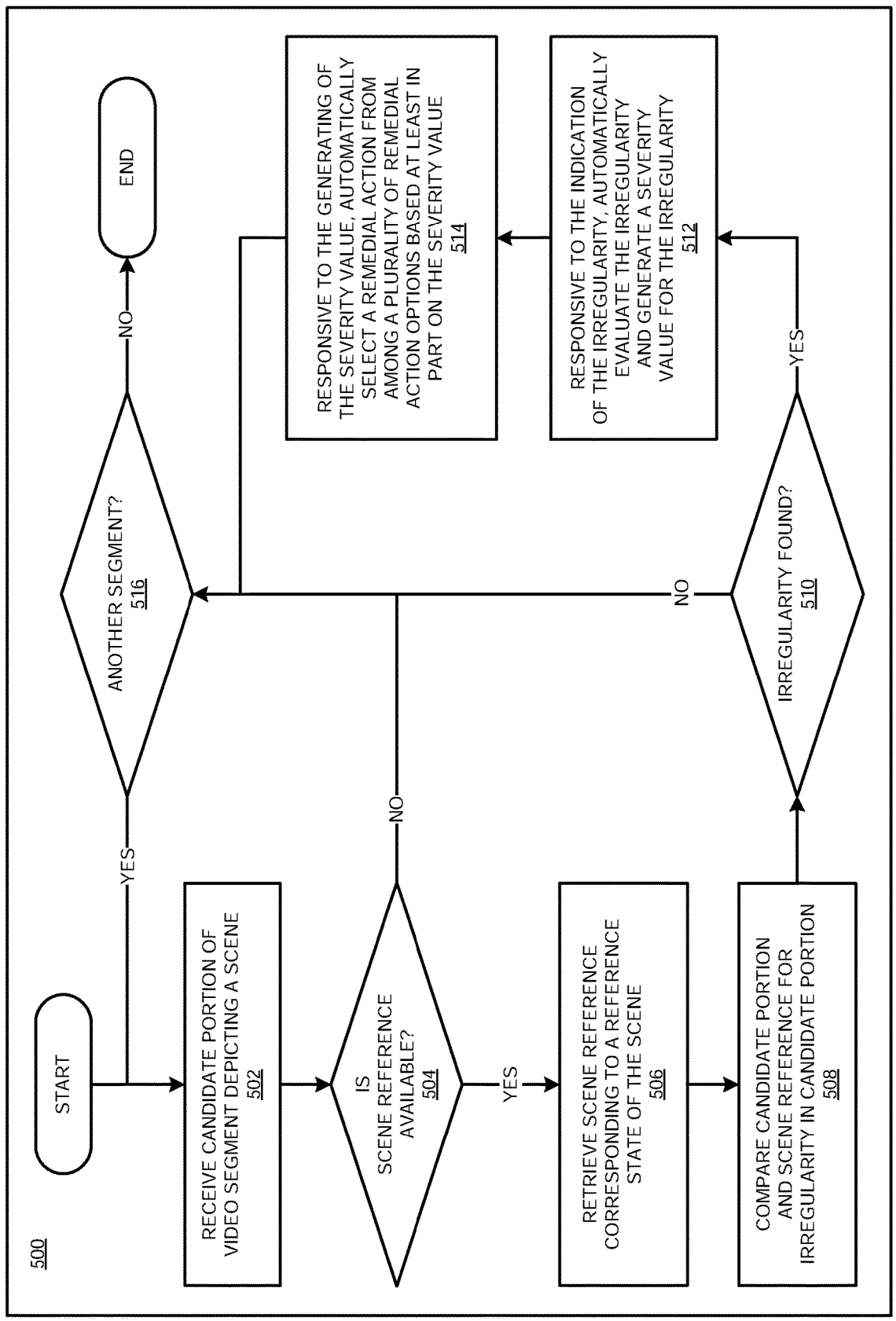
FIG. 5 depicts a flowchart of an example process for automatically detecting and remedying video irregularities in accordance with an illustrative embodiment.

With reference to FIG. 5, this figure depicts a flowchart of an example process for automatically detecting and remedying video irregularities in accordance with an illustrative embodiment. Process 500 can be implemented in application 300 in FIG. 3.

In block 502, the application receives a candidate image that depicts a scene. In block 504, the application checks whether a scene reference is available or not. If yes ("YES" path of block 504), in block 506, the application receives a scene reference that corresponds to a reference state of the scene. Otherwise ("NO" path of block 504), the application proceeds to block 516, described below. In block 508, the application evaluates the candidate image by comparing the candidate image and the scene reference to identify irregularities in the candidate image. In block 510, the application checks whether an irregularity was found in the candidate image. If yes ("YES" path of block 510), in block 512, the application automatically evaluates, for example using a classifier model, any irregularities found in order to generate a severity value associated with the irregularity. Otherwise ("NO" path of block 510), the application proceeds to block 516, described below. In block 514 the application selects a remedial action from among a plurality of remedial action options based at least in part on the severity value. In some such embodiments, the application also automatically initiates the selected remedial action. In block 516, the application checks whether another candidate image is available for processing or not. If yes ("YES" path of block 516), the application returns to block 502. Otherwise ("NO" path of block 516), the application ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, by one or more processors, a candidate portion of a video segment that depicts a scene;
   receiving, by one or more processors, a scene reference that corresponds to a reference state of the scene;
   comparing, by one or more processors, the candidate portion and the scene reference such that the comparing provides an indication of an irregularity in the candidate portion,
   wherein the candidate portion comprises an audio track associated with the video segment, wherein the scene reference comprises a reference audio track, and wherein the comparing compares the audio track associated with the video segment and the reference audio track;
   responsive to the indication of the irregularity in the candidate portion, automatically evaluating the irregularity, using one or more processors, such that the evaluating generates a severity value associated with the irregularity; and
   responsive to the generating of the severity value, automatically initiating, by one or more processors, a selected remedial action from among a plurality of remedial action options based at least in part on the severity value, wherein the automatic initiation of the selected remedial action includes automatic actuation of an element of video production equipment.

2. The method of claim 1, wherein the candidate portion comprises an image captured from a segment in the video segment, wherein the scene reference comprises a reference image, and wherein the comparing compares the image captured from the segment and the reference image.

3. The method of claim 2, wherein the irregularity in the candidate portion relates to a visual appearance of an element depicted by the candidate portion.

4. The method of claim 2, wherein the irregularity in the candidate portion relates to a location of an element in the scene depicted by the candidate portion.

5. The method of claim 2, wherein the evaluating of the of the irregularity includes:
   estimating a foreground region and a background region of the candidate portion; and
   determining whether the irregularity is in the background region or in the foreground region of the candidate portion, wherein the severity value depends at least in part on whether the irregularity is in the foreground region or in the background region of the candidate portion.

6. The method of claim 5, wherein the irregularity relates to an element depicted by the candidate portion that is outside an intended scope of an image topic.

7. The method of claim 2, wherein the irregularity relates to a shadow depicted by the candidate portion, and wherein the severity value is dependent upon a pixel value of the shadow.

8. The method of claim 1, wherein the candidate portion comprises a text overlay on a segment in the video segment, wherein the scene reference comprises a reference text, and wherein the comparing compares the text overlay and the reference text.

9. The method of claim 8, wherein the automatic actuation comprises automatically issuing a command to the video production equipment in order to revise the text overlay of the candidate portion.

10. The method of claim 1, wherein the automatic actuation comprises automatically issuing a command to the video production equipment in order to revise the audio track of the candidate portion.

11. The method of claim 1, wherein the receiving of the candidate portion includes receiving a video stream that includes a plurality of video segments, the candidate portion being one of the plurality of video segments.

12. The method of claim 11, wherein the receiving of the scene reference includes receiving a reference video stream that includes a plurality of reference video segments, the scene reference being one of the plurality of reference video segments.

13. The method of claim 1, wherein the scene reference includes at least a portion of video storyboard.

14. The method of claim 1, wherein the evaluating of the of the irregularity includes using a classifier model to generate the severity value for the irregularity.

15. The method of claim 1, wherein the automatic actuation comprises presenting a notification on a display component of the video production equipment.

16. The method of claim 1, wherein the automatic actuation comprises automatically changing a setting on a component of the video production equipment in order to correct the irregularity.

17. A computer usable program product comprising a computer-readable storage device, and program instructions stored on the storage device, the stored program instructions executable by a processor to perform operations comprising:
   receiving, a candidate portion of a video segment that depicts a scene;
   receiving, a scene reference that corresponds to a reference state of the scene;
   comparing, the candidate portion and the scene reference such that the comparing provides an indication of an irregularity in the candidate portion,
   wherein the candidate portion comprises an audio track associated with the video segment, wherein the scene reference comprises a reference audio track, and wherein the comparing compares the audio track associated with the video segment and the reference audio track;
   evaluating, automatically responsive to the indication of the irregularity in the candidate portion, the irregularity, such that the evaluating generates a severity value associated with the irregularity; and
   initiating, automatically responsive to the generating of the severity value, a selected remedial action from among a plurality of remedial action options based at least in part on the severity value, wherein the automatic initiation of the selected remedial action includes automatic actuation of an element of video production equipment.

18. The computer usable program product of claim 17, wherein the candidate portion comprises an image captured from a segment in the video segment, wherein the scene reference comprises a reference image, and wherein the comparing compares the image captured from the segment and the reference image.

19. A computer system comprising a processor, a computer-readable memory, and a computer-readable storage device, and program instructions stored on the storage device for execution by the processor via the memory, the stored program instructions executable by a processor to cause the processor to perform operations comprising:
   receiving, a candidate portion of a video segment that depicts a scene;
   receiving, a scene reference that corresponds to a reference state of the scene;
   comparing, the candidate portion and the scene reference such that the comparing provides an indication of an irregularity in the candidate portion,
   wherein the candidate portion comprises a text overlay on a segment in the video segment, wherein the scene reference comprises a reference text, and wherein the comparing compares the text overlay and the reference text;
   evaluating, automatically responsive to the indication of the irregularity in the candidate portion, the irregularity, such that the evaluating generates a severity value associated with the irregularity; and
   initiating, automatically responsive to the generating of the severity value, a selected remedial action from among a plurality of remedial action options based at least in part on the severity value, wherein the automatic initiation of the selected remedial action includes automatic actuation of an element of video production equipment.

* * * * *